United States Patent
Ketterhagen et al.

(10) Patent No.: US 7,680,957 B1
(45) Date of Patent: Mar. 16, 2010

(54) COMPUTER SYSTEM CONFIGURATION REPRESENTATION AND TRANSFER

(75) Inventors: Thomas Ketterhagen, Georgetown, TX (US); Bruce Bramhall, Austin, TX (US); Nicholas Graf, Austin, TX (US); Okan Okcu, Austin, TX (US)

(73) Assignee: Symantec Operating Corporation, Mountain View, CA (US)

( * ) Notice: Subject to any disclaimer, the term of this patent is extended or adjusted under 35 U.S.C. 154(b) by 1274 days.

(21) Appl. No.: 10/435,131

(22) Filed: May 9, 2003

(51) Int. Cl.
*G06F 15/173* (2006.01)
*G06F 9/445* (2006.01)

(52) U.S. Cl. .................. 709/246; 709/220; 709/221; 709/222; 709/223; 717/171; 717/176

(58) Field of Classification Search ......... 709/212–216, 709/248, 223, 246–247, 203, 201, 217–222; 707/204, 202; 714/15; 713/1, 168–178; 719/321, 328
See application file for complete search history.

(56) References Cited

U.S. PATENT DOCUMENTS

| | | | |
|---|---|---|---|
| 5,598,563 A | | 1/1997 | Spies |
| 5,708,604 A | | 1/1998 | Fontana et al. |
| 5,708,654 A | | 1/1998 | Arndt et al. |
| 5,715,456 A | | 2/1998 | Bennett et al. |
| 5,732,282 A | | 3/1998 | Provino et al. |
| 5,802,365 A | | 9/1998 | Kathail et al. |
| 5,890,204 A | | 3/1999 | Ofec et al. |
| 6,006,295 A | * | 12/1999 | Jones et al. .................. 710/62 |
| 6,078,990 A | | 6/2000 | Frazier |
| 6,170,055 B1 | | 1/2001 | Meyer et al. |
| 6,185,686 B1 | | 2/2001 | Glover |
| 6,279,011 B1 | * | 8/2001 | Muhlestein .................. 707/204 |
| 6,317,826 B1 | * | 11/2001 | McCall et al. .................. 713/1 |
| 6,346,954 B1 | | 2/2002 | Chu et al. |
| 6,393,560 B1 | * | 5/2002 | Merrill et al. .................. 713/2 |
| 6,535,915 B1 | * | 3/2003 | Valys et al. .................. 709/222 |

(Continued)

OTHER PUBLICATIONS

"AIX Change Management: Software Upgrade, Preparation, and Implementation," http://www.eservercomputing.com/ibmunix/tis/index.asp?sid=20&id=506&p=1, Dec. 2002, (9 pages).

(Continued)

*Primary Examiner*—Joseph Thomas
*Assistant Examiner*—Brendan Y Higa
(74) *Attorney, Agent, or Firm*—Robert C Kowert; Meyertons, Hood, Kivlin, Kowert & Goetzel, P.C.

(57) ABSTRACT

System and method for generating modifiable representations of system hardware and software configurations and for transferring a system to another system using the configuration representations. A configuration representation may include a backup of a system's files. A configuration representation may be modified, and may be used to restore the system to hardware that may be different than the original system's hardware. In one embodiment, a configuration transfer mechanism is provided to perform the transfer of a configuration representation from a source system to a target system. One embodiment of a configuration transfer mechanism may use one or more servers coupled to the source and target systems via a network. Another embodiment of a configuration transfer mechanism may be used to restore a source system's configuration and files from a source system directly to a target system coupled to the source system without using servers.

30 Claims, 7 Drawing Sheets

U.S. PATENT DOCUMENTS

| | | | |
|---|---|---|---|
| 6,535,998 B1 * | 3/2003 | Cabrera et al. | 714/15 |
| 6,640,291 B2 * | 10/2003 | Fujibayashi et al. | 711/162 |
| 6,654,830 B1 | 11/2003 | Taylor et al. | |
| 6,658,625 B1 * | 12/2003 | Allen | 715/523 |
| 6,681,323 B1 | 1/2004 | Fontanesi et al. | |
| 6,725,715 B2 | 4/2004 | Igarashi et al. | |
| 6,735,715 B1 | 5/2004 | Graham | |
| 6,804,774 B1 * | 10/2004 | Larvoire et al. | 713/2 |
| 6,813,708 B2 * | 11/2004 | Smith et al. | 713/1 |
| 6,820,035 B1 | 11/2004 | Zahavi | |
| 6,944,653 B2 * | 9/2005 | Fong et al. | 709/220 |
| 7,055,148 B2 * | 5/2006 | Marsh et al. | 717/172 |
| 7,107,534 B1 | 9/2006 | de Jong et al. | |
| 7,293,272 B1 | 11/2007 | Okcu et al. | |
| 7,322,010 B1 | 1/2008 | Mikula | |
| 7,512,833 B1 * | 3/2009 | Murphy et al. | 714/5 |
| 2002/0019908 A1 | 2/2002 | Reuter et al. | |
| 2003/0069951 A1 * | 4/2003 | Fong et al. | 709/222 |
| 2003/0074527 A1 | 4/2003 | Burton et al. | |
| 2003/0158926 A1 * | 8/2003 | Kroening | 709/223 |
| 2003/0159070 A1 | 8/2003 | Mayer et al. | |
| 2003/0195995 A1 | 10/2003 | Tabbara | |
| 2004/0091175 A1 | 5/2004 | Beyrouti | |
| 2004/0111250 A1 | 6/2004 | Hensley | |
| 2004/0221146 A1 * | 11/2004 | Baumann | 713/1 |
| 2004/0233910 A1 * | 11/2004 | Chen et al. | 370/395.5 |

OTHER PUBLICATIONS

"Introducing IBM Tivoli Configuration Manager," http://publib.boulder.ibm.com/tividd/td/ITCM/GC23-4703-00, 2002, (11 pages).

Ron M. Goodwyn, "Ignite-UX System Recovery," http://www.interex.org/pubcontent/enterprise/mar00/17gooddwi.html, 2000, (10 Pages).

* cited by examiner

COMPUTER SYSTEM CONFIGURATION REPRESENTATION AND TRANSFER

BACKGROUND OF THE INVENTION

1. Field of the Invention

This invention is related to the field of computer systems and, more particularly, to software used in computer system restores.

2. Description of the Related Art

In the computer industry, it may sometimes be desirable to migrate one system to another. If the source and target systems have identical hardware, this may not be a problem. However, if the source and target systems have dissimilar hardware, the task of migrating the source system to the target system may be difficult and time-consuming, if not impossible. The reasons a direct restoration of a source system's files to a target system with different hardware may fail may include, but are not limited to, the following. The source system's backup image does not always have the device drivers for the new hardware. The source system's backup image may include configuration information that pertains to the old hardware and is not applicable to the new. The quantity of hardware components (disk, mass storage controllers, network interface cards, processors, etc.) may change, requiring additional configuration.

IBM creates a partial system configuration in their AIX "mksysb" image. This partial system configuration cannot be modified. HP does something similar in their ignite product. Both are tightly associated with the original system hardware and with a backup image. Inventory capturing software (e.g. Tivoli's Configuration Manager) catalogs a computer system's hardware and software configuration. However, this catalog is not sufficient for reproducing the computer system on other hardware. For example, it does not include the computer's data files. The purpose of these inventory systems is to enumerate pieces of hardware and software or to identify computer systems for software distribution.

Cloning products that work with images (e.g. mksysb for AIX, Symantec's Ghost for PCs) typically require similar hardware. At a minimum, they require the same mass storage device or they cannot boot. Backup/restore packages perform file backup of data files, but typically do not include hardware configurations and settings. System image packages (e.g. Symantec's Ghost) generate an image of both configuration and data, but are not editable. These images cannot be moved or placed on other types or configurations of systems.

Therefore, it is desirable to provide a backup and restore mechanism that captures both hardware configuration and settings and data (files) from a system. It is also desirable that the hardware configuration be movable to other target systems with potentially dissimilar hardware, and editable to fix discrepancies in hardware configurations between the source and target systems.

SUMMARY

Embodiments of a system and method for generating modifiable representations of system hardware and software configurations and for transferring a system on a source device to a target using a configuration representation of the source device are described. Embodiments may be used to generate representations of computer system hardware and software configurations ("configuration representations"). A configuration representation may be defined as a representation of a computer system's software and hardware configuration, and may also include a rule set used to manipulate the configuration representation. A configuration representation may include a backup set of a system's files.

A configuration representation may be generated for a system and stored as data in computer memory. In one embodiment, a configuration representation stores the configuration of a computer system so that it may be managed and manipulated, if necessary or desired. A configuration representation may be stored, viewed and modified, if necessary, and may be used to restore the original system to the original system hardware or to another system with hardware that may be, but is not necessarily, different than the original system's hardware. In one embodiment, a configuration transfer mechanism is provided to perform the transfer of a configuration representation from a source system to a target system. In one embodiment, a configuration representation may be compared to a configuration collected from a target system to verify that a restore of the configuration representation to the target system will be successful, for example.

In one embodiment, the configuration representations of two or more computer systems may be merged to form one configuration representation that may then be moved or restored to a single computer system or even to two or more computer systems. Configuration information and settings for hardware and data of each system may be captured into a configuration representation for each system. After capturing the configuration representations, the configuration representations may be merged to form a merged configuration representation.

In one embodiment, a configuration transfer mechanism may be used to backup and restore configuration representations and files using one or more servers coupled to the source and target systems via a network. In one embodiment, this configuration transfer mechanism, referred to as a network restore mechanism, may include a restore server configured to capture system configuration information of a source device into a configuration representation, modify the configuration representation to generate a modified version of the configuration representation, and configure the target device according to the modified version of the configuration representation. The network restore mechanism may also include a backup server configured to back up and store file data of the source device. In one embodiment, the source device may include an agent of the configuration transfer mechanism configured to provide the system configuration information to the restore server.

In one embodiment, a configuration transfer mechanism may be used to restore a source system's configuration and files from a source system directly to a target system coupled to the source system, and with a potentially different hardware configuration, without using servers. This configuration transfer mechanism may also be referred to as a direct restore mechanism. In one embodiment, system configuration information of the source system may be modified. In one embodiment, a configuration representation of the source device may be generated and may include the system configuration information and the file data. In this embodiment, the system configuration information may be modified in the configuration representation. The target system may be configured according to the modified system configuration information. Files of the source system may be copied to the target system.

BRIEF DESCRIPTION OF THE DRAWINGS

The following detailed description makes reference to the accompanying drawings, which are now briefly described.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for generating modifiable representations of system hardware and software configurations and for transferring a system on a source device to a target using a configuration representation of the source device are described. Embodiments may be used to generate representations of computer system hardware and software configurations (which may be referred to collectively as "configurations" or "configuration representations"). A configuration representation may be defined as a representation of a computer system's software and hardware configuration and may also include a rule set used to manipulate the configuration representation. A configuration representation may include a backup set of a system (every file, including system files, and hardware and software configuration information and settings) but not the hardware itself. In one embodiment, an enterprise backup and restore utility, such as NetBackup, may be leveraged to provide backup and restore capabilities for files.

A configuration representation may be generated for a system and stored as data in computer memory (e.g. local or remote disk, RAM, tape, etc.). In one embodiment, a configuration representation stores the configuration of a computer system so that it may be managed and manipulated, if necessary or desired. A configuration representation may be stored, viewed and changed before it is used to configure another system, e.g. a replacement system, which may include dissimilar hardware. A captured configuration representation may be modified, if necessary, and used to restore the original system (including hardware and software configuration information, operating system, applications and data) to the original system or to another system with hardware that may be, but is not necessarily, different than the original system's hardware. In one embodiment, a configuration transfer mechanism is provided to perform the transfer of a configuration representation from a source system to a target system.

From both the programmer and user's perspective, configuration representations allow the configurations of many systems to be stored and managed. Configuration representations may allow configurations that are running on one system with one set of hardware, but that are to be used to configure one or more different systems with potentially different hardware, to be captured and modified if necessary or desired. A configuration representation may be compared to a configuration collected from a target system to verify that a restore of the configuration representation to the target system will be successful, for example.

In one embodiment, one or more rule sets may be applied (e.g. using a utility application) to a configuration representation to determine one or more of, but not limited to:
  whether the configuration representation can be moved to another computer system including dissimilar hardware.
  what is different between two configurations.
  whether two configuration representations can be merged.
  whether the configuration representation is complete.
  what details of the configuration representation can be modified.

Configuration representations may be used in a variety of applications including one or more of, but not limited to, system restore applications, disaster recovery directors, change managers, and capacity planning tools.

One application in which embodiments of a configuration representation may be used is in disaster recovery solutions where replacement hardware may not be identical to original hardware in its makeup, vendor or quantity. Disaster recovery solutions need a way to restore a system to hardware that may be similar to but different than the original hardware. The differences may include one or more of, but are not limited to, different types of mass storage devices and network interface cards.

FIGS. 1-8 and their descriptions illustrate means for capturing a configuration representation of the source device, means for modifying the configuration representation to generate a modified version of the configuration representation, and means for configuring the target device according to the modified version of the configuration representation.

Figure 1:
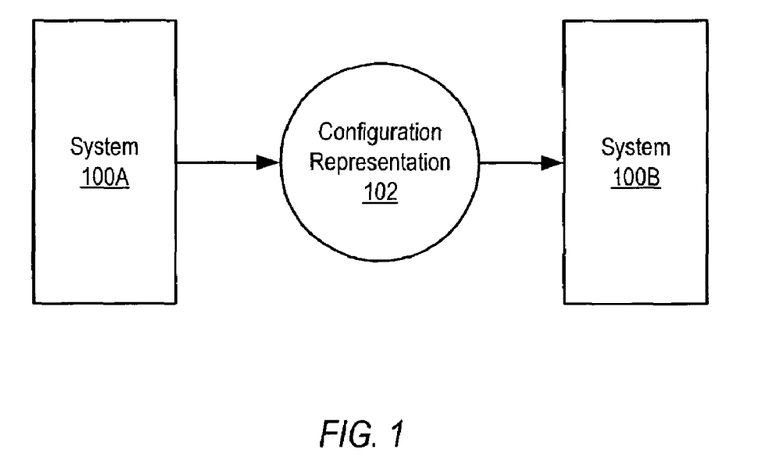
FIG. 1 illustrates a system restore using a configuration representation according to one embodiment.

FIG. 1 illustrates a system restore using a configuration transfer mechanism to transfer a configuration representation from a source system to a target system according to one embodiment. Systems 100 may be any of various types of devices, including, but not limited to, a personal computer system, desktop computer, laptop or notebook computer, mainframe computer system, workstation, network computer, or other device. Systems 100 may run any of a variety of operating systems, including, but not limited to, Microsoft's Windows (e.g. Windows 2000, NT, etc.), Sun's Solaris, Unix, Linux, IBM's AIX, etc. Systems 100 may each include at least one processor. The processor may be coupled to a memory, which may include various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. Systems 100 may couple over a network to one or more other devices via one or more wired or wireless network interfaces.

A configuration representation 102 may be generated for a system 100A and stored as data in computer memory (e.g. local or remote disk, RAM, tape, etc.). The configuration representation 102 may then be modified, if necessary, and used to restore the original system (including hardware and software configuration information, operating system, applications and data) to target system 102B with hardware that may be, but is not necessarily, different than the original system 102A's hardware. In one embodiment, a network restore mechanism may be used to backup and restore configuration representations and files using one or more servers coupled to the source and target systems via a network. In one embodiment, a direct restore mechanism may be used to restore a source system's configuration representation and files from one system directly to a target system coupled to the source system.

Figure 2:
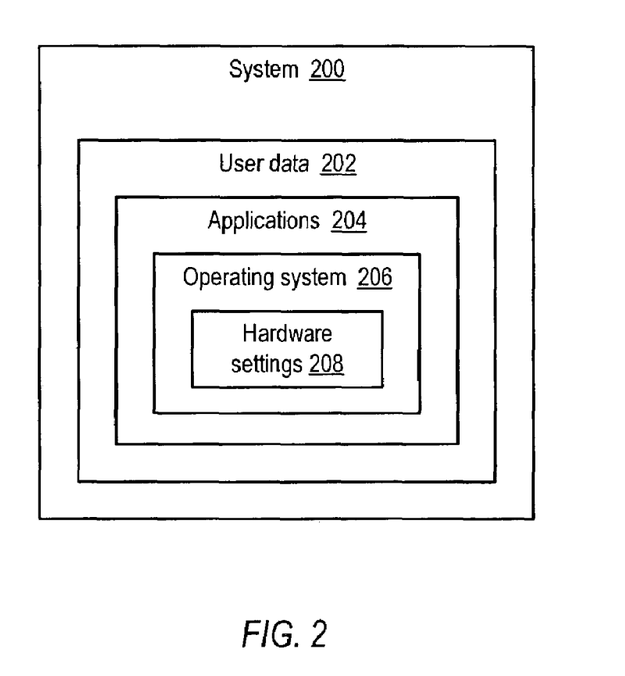
FIG. 2 illustrates components of a computer system according to one embodiment.

FIG. 2 illustrates components of a computer system according to one embodiment. A computer system 200 generally includes hardware settings 208, operating system software 206, application software 204, and user data 202. Operating system software 206 and application software 204 may have associated configuration information and settings. In one embodiment, a configuration representation may include all of the information required to configure a new system from scratch, including, but not limited to, the software (both operating system and application) and hardware and software configuration information and settings. When a configuration representation is captured, a backup of user data 202 may also be performed (e.g. using a network backup program). In one embodiment, the data backup may be stored separately from the configuration representation. In another embodiment, the data backup may be stored with or included in the configuration representation. Once a computer's configuration is captured into a configuration representation, the configuration representation may be moved to another location and/or restored to another, potentially dissimilar computer system, as illustrated in FIG. 1.

In one embodiment, the information in the configuration representation may be collected automatically, e.g. using agents running on a system. In one embodiment, a portion of the information may be manually entered by a user. In one embodiment, a combination of automatic collection and manual entry of the information may be used. In one embodiment, a computer system's configuration may be captured into a configuration representation at intervals, and, for example, hardware and software changes made between any two such intervals may be identified by comparing the configuration representations captured at the intervals.

In one embodiment, a configuration representation may include, but is not limited to, one or more of the following: a hardware inventory, non-volatile memory (e.g. NVRAM) settings, volume configuration, device driver versions, operating system (OS) version, OS patch information, OS configuration, application software inventory, application patches, application configuration, a system state at a point in time (e.g. running processes, used disk space, etc.) and a backed-up set of files (e.g. data files) from the system. In one embodiment, the set of files on the system may be backed up, e.g. by a storage manager or a network backup utility.

Collected hardware configuration information may be used to acquire same or equivalent hardware, and also may be used to select device drivers for a target system. Collected volume configuration information may be used to partition one or more disks of a target system. Collected non-volatile memory settings may be used to set up hardware of a target system. Collected OS information may be used to acquire and/or configure OS software with appropriate patches on a target system. Collected application information may be used to acquire and/or configure application software with patches on a target system. The collected system state may include what processes are running and how much storage space is required to backup the system.

This collection of data in a configuration representation may be moved, copied or modified, and may be used, for example, to verify a target system, be compared with other configuration representations, merged with one or more other configuration representations from other systems, and/or to restore the system to a target system. The target system may be the original system or another system with a potentially different hardware configuration.

Figure 3:
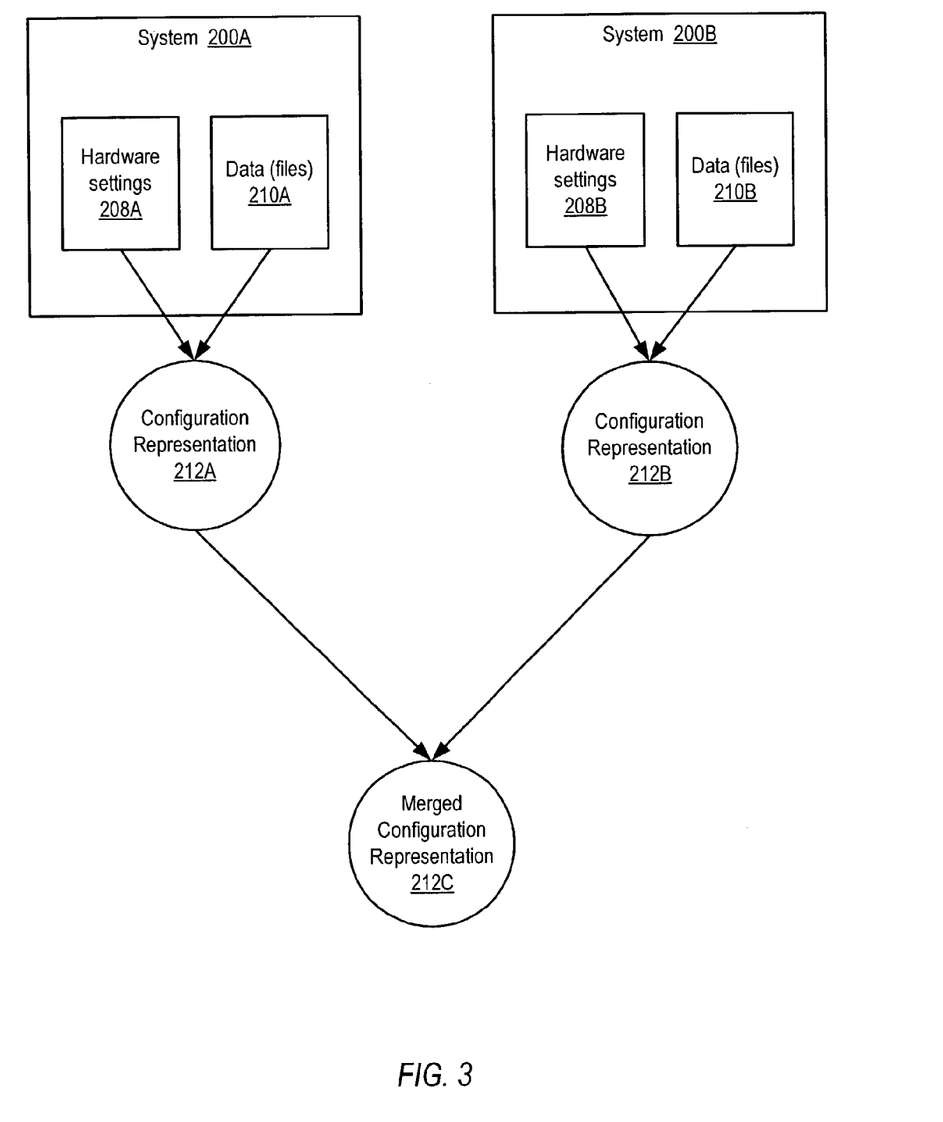
FIG. 3 illustrates merging two configuration representations according to one embodiment.

As illustrated in FIG. 3, in one embodiment, the configuration representations of two or more computer systems may be merged to form one configuration representation that may then be moved or restored to a single computer system or even to two or more computer systems. Configuration information and settings for hardware 208 and data 210 of each system 200 (e.g. hardware settings 208A and 208B and data 210A and 210B) may be captured into a configuration representation 212 for each system 200. Data 210 may include, but is not limited to, user data files, system software and other system files, application software and other files, configuration information and settings for system and application software, and other information that may be necessary to restore the system. After capturing configuration representations 212A and 212B, the configuration representations may be merged to form a merged configuration representation 212C. In one embodiment, merging two configuration representations 212 may be performed automatically. In one embodiment, merging two configuration representations 212 may be performed manually. In one embodiment, merging two configuration representations 212 may be performed using a combination of manual and automatic merging mechanisms. The merged configuration representation 212C may then be restored to either one or both of systems 200A and 200B, or to one or more other systems 200 not shown. Merged configuration representation 212C may be modified if necessary or desired during restore to a system 200. Merged configuration representation 212C may be, for example, compared to other configuration representations 212, modified if necessary, merged with other configuration representations, and generally used like any other configuration representation.

Embodiments may allow users to restore a system (e.g. a Windows-based system) to target hardware that is different from the source hardware. A representation of a computer system's software and hardware configuration may be used to restore a system backup to dissimilar hardware. For example, a single-processor IDE-based system from Gateway may be restored to a multi-processor SCSI-RAID system from DELL, or vice versa. Before, during or after the system's data files are restored from a backup (e.g. a backup produced using NetBackup), the restored system configuration may be modified to reflect the differences in hardware components. Embodiments preferably allow a server or client system to be brought back up quickly on a different computer system.

Source and target systems may be from different vendors, different makes, and/or have dissimilar hardware sets.

In one embodiment, an agent installed on a system collects and stores configuration information on file system sizes, disk geometry, network cards, disk controllers, device drivers and other software and hardware-related information sufficient to restore a system configuration. The configuration information may include disk partition information (e.g. a table) that may read from one or more disks, and active bit information. In one embodiment, network information may be stored as part of the configuration representation. In one embodiment, everything stored on and all information about the hardware of a system may be collected and stored in a configuration representation. In one embodiment, an agent may be used to collect configuration information using API calls or other appropriate methods. In one embodiment, a network backup utility such as NetBackup may be used to back up the data (files) of a system. In one embodiment, the configuration information and files may be captured "hot" from a running system.

In one embodiment, a representation of a computer system's hardware and software configuration may be captured and stored on a server. The configuration representation may then be compared to the hardware configuration of the target hardware (the hardware of a system that will be restored to) and modified appropriately, if necessary or desired. For example, device drivers may be added or removed from the configuration, and/or interface settings may be changed. Once the modifications are complete, the restore process may use the configuration representation to create a working restore environment in which files may be restored, e.g. from a network backup. Once the files are restored, the configuration representation may be used to modify the restored system so that it will function properly after it is rebooted.

Figure 4A:
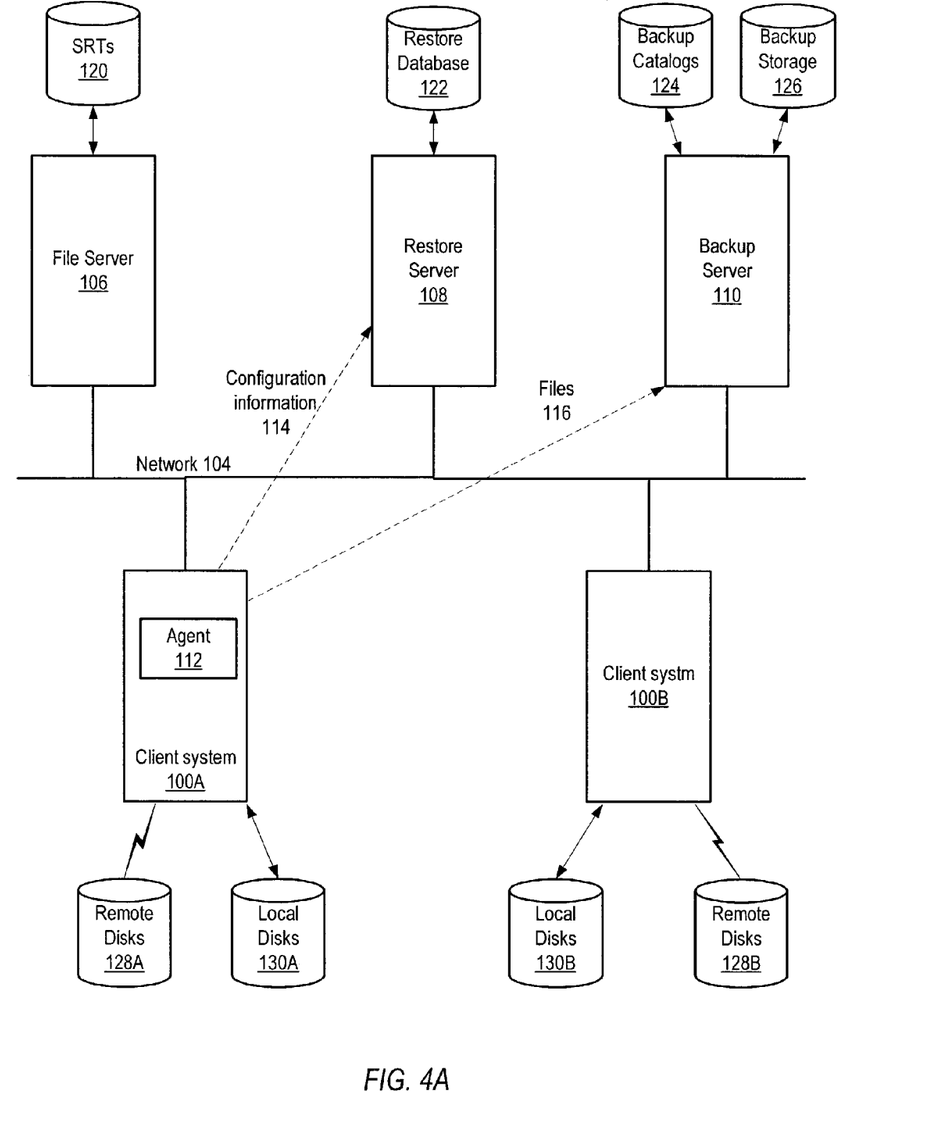
FIG. 4A illustrates a network restore mechanism for capturing and restoring configuration representations using servers in a network environment according to one embodiment.
Figure 4B:
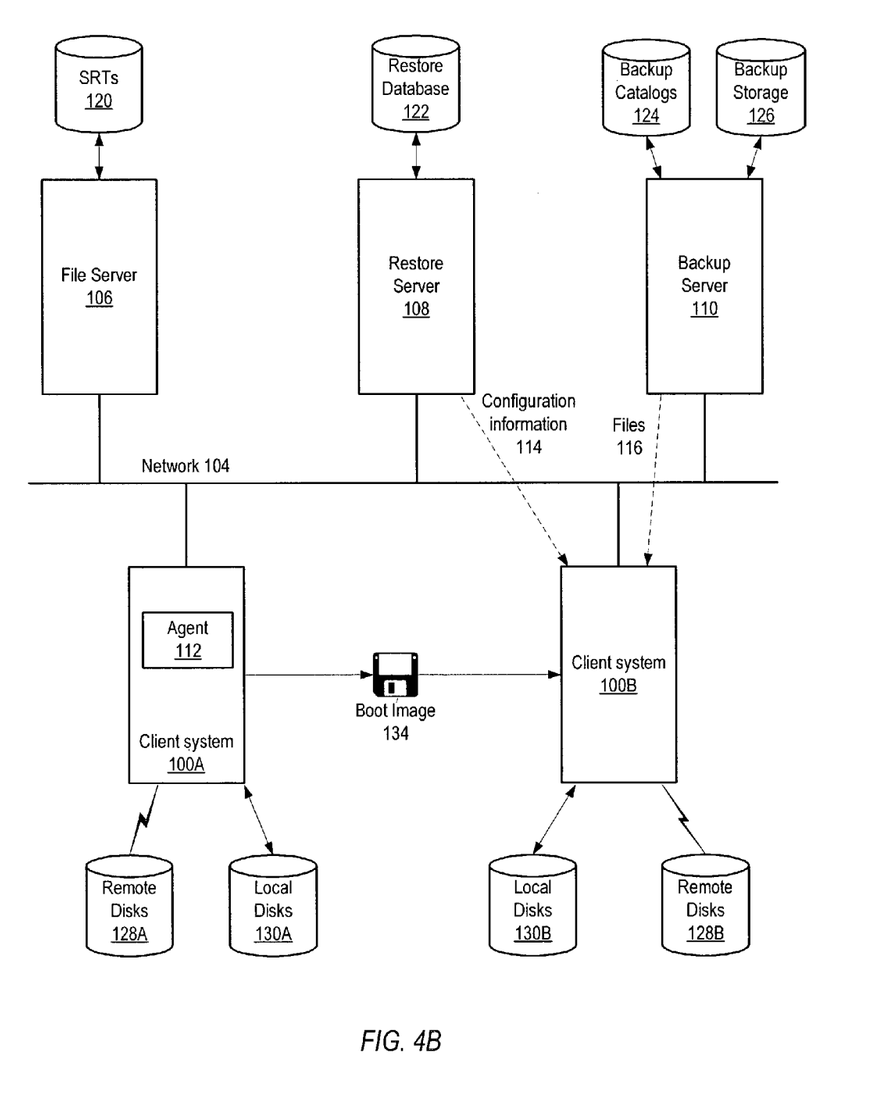
FIG. 4B illustrates a network restore mechanism using the configuration information stored in a configuration representation to configure a target client system according to one embodiment.

FIGS. 4A and 4B illustrate a network restore mechanism for capturing and restoring configuration representations using servers in a network environment according to one embodiment. Configuration representations may be used to perform system restores of a system's (e.g. client system 100A) backup image to a target system (e.g. client system 100B) that may have different hardware than the original system had at the time of backup. A captured configuration representation may be modified or edited prior to or during restore to a target system, enabling a user to change the configuration if necessary or desired.

As illustrated in FIG. 4A, in one embodiment, agents 112 may be deployed on client systems 100 to capture configuration information for the client systems 100. In one embodiment, an agent 112 may transfer configuration information 114 for client system 100A to restore server 108 via network 104. Network 104 may be any kind of network, including wired or wireless networks. In one embodiment, the configuration information 114 may be stored in a configuration representation on restore server 108. In one embodiment, one or more utilities, which may be provided by the restore server 108, may provide the ability to edit the stored configuration representations. In one embodiment, these utilities may be accessed directly on restore server 108. In another embodiment, these utilities may be accessed remotely from another system coupled to restore server 108 via network 104.

While FIG. 4A shows file server 106, restore server 108, and backup server 110 as separate systems, note that in other embodiments one or more of the servers may be included in one system. For example, restore server 108 and file server 106 may be combined into one server.

Client system files 116 may be located on one or more local disks 130 and/or on one or more remote disks 128. Files 116 from client system 100A may be backed up, for example to a backup server 110 using a network backup utility such as NetBackup. In one embodiment, client software for the appropriate network backup utility may be included on client systems 100 to enable network backup.

Note that, while FIG. 4A illustrates configuration information 114 and files 116 being backed up for client system 100A, configuration information and files for client system 100B may be backed up as well. In one embodiment, backups from two or more client systems may be merged and restored to one or more client systems. For example, backups of client systems 100A and 100B may be merged and restored to client system 100B.

The following describes one embodiment of a setup process for a network configured to perform restores of systems using configuration representations as described herein. A backup server 110 may be installed and configured. A client storage area may be created on the backup server 110. Client classes for the network backup utility may be created. Restore server 108 and file server 106 may be installed and configured.

In one embodiment, a network file system such as SAMBA may be installed on file server 106. SAMBA allows end users to access and use files, printers, and other commonly shared resources on an intranet or on the Internet. SAMBA may be installed on a variety of operating system platforms, including, but not limited to: Linux, most common Unix platforms, OpenVMS, and OS/2. In one embodiment, one or more Shared Root Trees (SRT) from Windows 2000OS may be created on file server 106.

One or more client systems 100 may be installed and configured. Network backup utility client software and agents 112 may be installed on client systems 100. Client system may be from different vendors and/or of different models, configurations, etc. For example, in FIG. 4A, client system 100A may be an IBM system and client system 100B may be a Dell system.

After setup is complete, one or more of client systems 100 may be backed up. A backup may include backup of files 116 to backup system 110 and capturing of configuration information 114 to restore server 108. In one embodiment, restore server 108 may coordinate the capturing and storing of configuration information 114 from one or more of client systems 100 to restore server 108 and files 116 to backup system 110. Backups may, for example, be scheduled to be performed periodically, for example once a day. In one embodiment, a backup may be manually initiated by a user. In one embodiment, stored configuration information 114 may be modified, for example using a utility provided by restore server 108.

As illustrated in FIG. 4B, a network restore mechanism may use the configuration information 114 stored in a configuration representation to configure a client system such as client system 100B during and/or post-restore. In one embodiment, as a system is being restored to a target system (e.g. client system 100A to client system 100B), a restore environment may be created that allows files 116 of the system to be restored to the target system (e.g. client system 100B) from backup server 110. The files 116 may be restored to one or more local disks 130 and/or to one or more remote disks 128, in this example local disks 130B and remote disks 128B. After the system's original files are restored to the target system, the files may be modified (e.g. device driver files may be added, network settings changes, etc.) so that the target system will operate correctly after it is rebooted.

The following describes one embodiment of a restore process for a network configured to perform restores of systems using configuration representations as described herein. Client systems 100 may be backed up. Backing up may include backing up files to the backup server 110 and capturing configuration information to configuration representations on the file server 106.

To restore client system 100A to client system 100B, a boot image 134 (e.g. a floppy or other boot medium, such as a CD) may be created. In one embodiment, the stored configuration representations of client systems 100A and client system 100B may be merged, if necessary or desired. In one embodiment, if a configuration representation of client system 100B has not been performed, hardware configuration information for system 100B may be discovered. A "prepare to restore" may be performed for client system 100B on or by restore server 108. Client system 100B may be booted using boot image 134. A restore environment may be created on client system 100B. Configuration information 114 may be copied from restore server 108 to client system 100B. One or more disks on client system 100B may be repartitioned and/or formatted, if necessary. Files 116 from client system 100A may then be restored from backup server 110 to client system 100B. In one embodiment, registry and/or boot.ini system files may be modified on client system 100B. One or more other restore tasks may be performed, for example, copying files. Client system 100B may then be rebooted. After this process, client system 100B has client system 100A's operating system and hardware configuration, applications, settings and user files.

Figure 5:
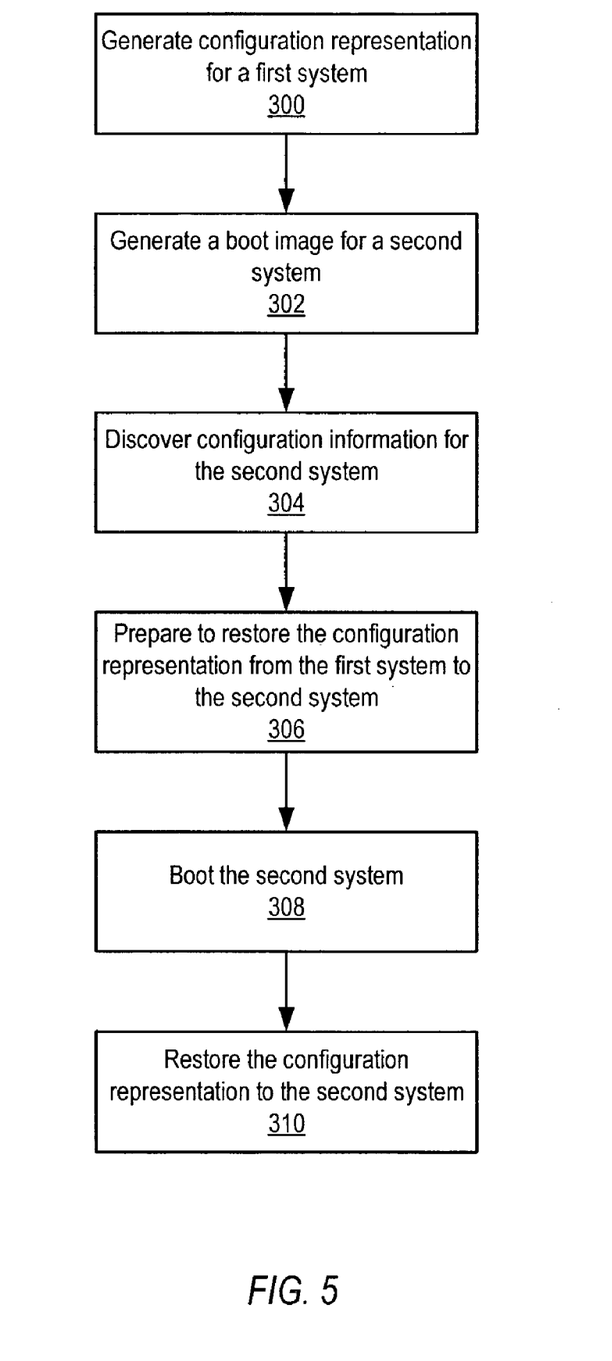
FIG. 5 is a flowchart illustrating a method of performing a system restore from one client to another using a network restore mechanism according to one embodiment.

FIG. 5 is a flowchart illustrating a method of performing a system restore from one client to another using a network restore mechanism such as illustrated in FIGS. 4A-4B according to one embodiment. Servers and clients may first be installed and set up. As indicated at 300, the hardware configuration for a first client system may be captured and stored as a configuration representation. Files for the first system may also be backed up, for example using a network backup utility. As indicated at 302, a boot image for a second system (the target system) may be generated. As indicated at 304, configuration information for the second system may be discovered. Low-level configuration information for the second system may be discovered (e.g. plug-and-play IDs, etc.). Discover may be performed manually, automatically, or using a combination of manual and automatic mechanisms. This discovered information may be compared to the configuration representation captured from the first system. As indicated at 306, a "prepare to restore" may be performed on the second system. During prepare to restore, the configuration representation may be modified based on the comparison of the configuration representation captured from the first system with the discovered configuration information from the second system. Modification of the configuration representation may include one or more of, but is not limited to, changing MAC address, IP address(es), adding or changing device drivers, etc. As indicated at 308, the second system may be booted with the boot image. As indicated at 310, the configuration representation may be restored to the second system. Any discovered differences or incompatibilities may be fixed manually or automatically, or using a combination of the two. Files from the first system may then be restored to the second system. Disk partition mapping may then be performed.

Embodiments may provide the capability to restore a client backup image (e.g. a Windows client backup image) to hardware that is different from the hardware from which the client backup image was taken. Embodiments of the restore process using configuration representations as described herein may be used to reconcile differences including one or more of, but not limited to, disk controllers, network cards, and motherboard changes that require a different Hardware Abstraction Layer (HAL) and/or kernel.

Examples of when a source system may need to be restored to a target system with dissimilar hardware may include one or more of, but are not limited to:

When changing the preferred vendor for a class of systems in an enterprise.

When migrating an application from older hardware to the latest available hardware.

When a system has suffered critical hardware failure and similar hardware is not available for replacement (i.e., no longer provided by the vendor).

When a disaster recovery provider does not have identical hardware at the disaster recovery site.

When staging and verifying an application at a test site with different hardware from the production site (an application can be migrated from test to production).

Examples of conditions when the restore mechanism described herein may be used to restore a source system to a target system with dissimilar hardware may include one or more of, but are not limited to:

The target system has a disk controller that the source system did not have.

The source system had a disk controller that the target system does not have.

The target system has a network card that the source system did not have.

The source system had a network card that the target system does not have.

The target system requires a different HAL/kernel than the source system. The case of a different HAL/kernel may require special consideration when Windows Service Packs are installed on the client. A Service Pack is preferably used during the restore that exactly matches the Service Pack level of the client.

The target system will have different TCP/IP settings than the source system had.

In one embodiment, during the restore process, the configuration of the source system may be saved (e.g. to a configuration representation). In one embodiment, the restore process uses the configuration information saved by a save configuration process. In one embodiment, the save configuration process may run with every server-initiated backup. Hardware differences between the target system and the source system may be determined. The hardware differences may include one or more of, but are not limited to, disk controller, network card, HAL/kernel, TCP/IP settings, specific media (audio/video drivers), and hardware (MAC) address. Determining these differences may help to determine what drivers may need to be added to the source system's saved configuration representation before performing the restore to the target system.

In one embodiment, to perform a restore to a dissimilar system, the exact hardware (MAC) address of the target system is required. Without this MAC address, the restore procedure may not be able to restore the network properties of the target system to that of the source system. How this information is determined may depend on the status of the target system. The following are some examples of the status, and are not intended to be limiting:

Target system is new from the factory: use the manufacturer's website to determine the drivers used by this machine.

Target system has same base Operating System as the source client: install the agent on the target system, register the agent with the restore server, and run the save configuration process on the target client. This will capture the target system's configuration, including device drivers.

Drivers may be added to the source system's saved configuration representation if necessary. Once the drivers that are necessary for the target system are determined, the drivers may be added to the configuration representation of the source system. Methods to add the necessary drivers to the source client's saved configuration may include one or more of, but are not limited to: adding individual drivers and copying another client's configuration. In one embodiment, a combination of these two methods may be used.

To add an individual driver, the specific required driver is located, for example on a CD-ROM or another installation medium, on a manufacturer's website, or on another client system. In one embodiment, if on another client system, a wizard or other utility may be used to add a driver to the restore server. When the necessary drivers have been added to the restore server, the drivers may be added to an editable copy of the source system's configuration representation. In one embodiment, a GUI may be provided to perform these tasks.

In one embodiment, a separate client system may be used to create the driver package using a copy of the needed driver(s) (e.g. from CD-ROM, manufacturer's website, or another client system). To add the driver(s) to the source system's configuration representation on the restore server, the driver package may be pushed to the restore server, where it can be added to the source system's configuration representation. In one embodiment, a GUI may be provided on the restore server through which the created driver package(s) may be added to the source system's configuration representation.

If there is another client system with a hardware configuration that closely matches the configuration of the target system, that configuration may be copied to the source system configuration representation. One embodiment may provide a GUI to copy the desired configuration to the source system configuration representation. An editable copy may be created to add or remove individual drivers as necessary. In one embodiment, after copying the hardware configuration from a separate client system and assigning it to the source system configuration representation, it may be necessary to add or remove one or more drivers to or from the configuration representation.

In one embodiment, the Service Pack the source system originally used may be added to the source system's saved configuration representation if necessary. In order for a restore to a dissimilar system to work successfully, the configuration representation used for the restore must have the same Service Pack as the source client. If a Service Pack has already been added to the file server, the Service Pack in the configuration representation prior to the restore may be selected.

If a Service Pack for the source system was not created, but one is required, the Service Pack may be created from another client system. One embodiment may provide a wizard or other utility to add the Service Pack to the file server. The Service Pack may then be selected, for example from an Edit Configuration screen of a configuration representation editing utility.

The source system may then be restored to the target system using the configuration representation from the source system. After the previously described actions have been performed, the restore process may proceed as a normal restore. In one embodiment, the source system and its edited configuration representation may be selected from a GUI (e.g. provided on the restore server) and the restore initiated.

On the first logon of the restored system, cleanup of the restore may be performed if necessary. In one embodiment, after the system has been restored, an administrator logon may be required to complete the changes. In one embodiment, the restore mechanism may display a status box detailing the steps. While the status box is visible, one or more indications that new hardware has been found may be displayed by the operating system.

Figure 6:
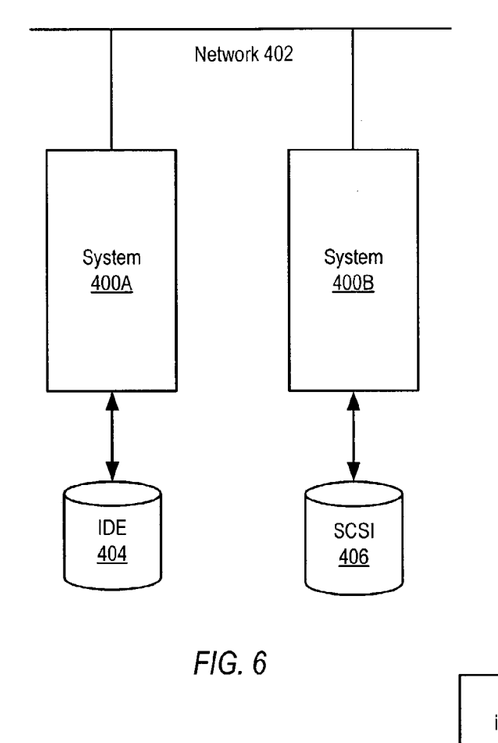
FIG. 6 illustrates two exemplary dissimilar systems for which a direct restore may be performed according to one embodiment.
Figure 7:
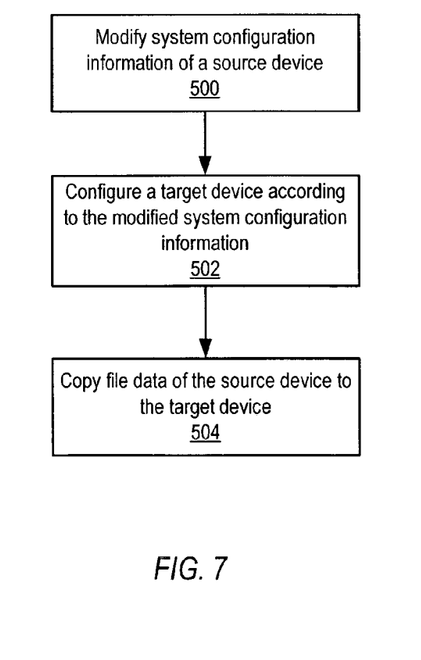
FIG. 7 is a flowchart illustrating a configuration transfer mechanism for transferring a configuration directly from a source system to a destination system according to one embodiment.
Figure 8:
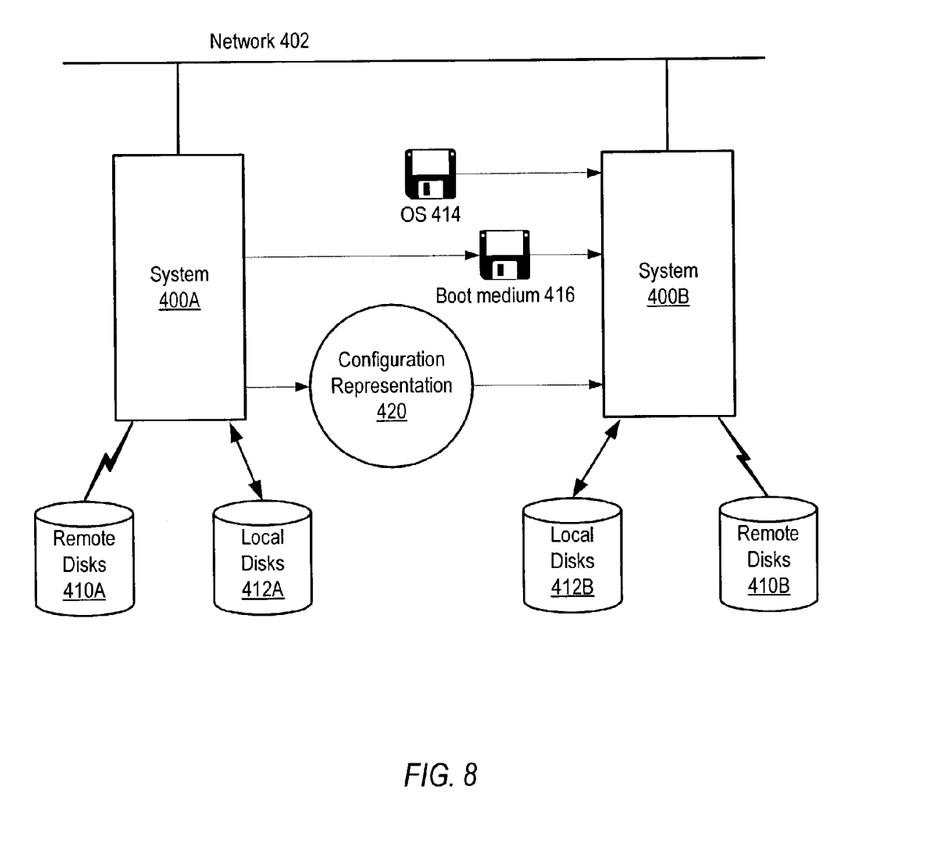
FIG. 8 illustrates setup and restore using a direct restore mechanism according to one embodiment.

FIGS. 6 through 8 illustrate embodiments of a configuration transfer mechanism for directly restoring one system to another potentially dissimilar system without using servers on a network. This configuration transfer mechanism may be referred to as a direct restore mechanism. FIGS. 6 through 8 and their descriptions represent means for modifying system configuration information of a source device, means for configuring a target device according to the modified system configuration information, and means for copying file data of the source device to the target device.

FIG. 6 illustrates two exemplary dissimilar systems for which a direct restore may be performed according to one embodiment. System 400A includes one or more IDE storage devices, and system 400B includes one or more SCSI storage devices. Other hardware differences, as previously described, may exist between the two systems. Using the direct restore mechanism, one of the systems may be migrated to the other system despite the dissimilar hardware between the two systems.

FIG. 7 is a flowchart illustrating a configuration transfer mechanism for transferring a configuration directly from a source system to a destination system according to one embodiment. As indicated at 500, system configuration information of the source system may be modified. In one embodiment, the system configuration information may include hardware and software configuration information. In one embodiment, a configuration representation of the source device may be generated and may include the system configuration information and the file data. In this embodiment, the system configuration information may be modified in the configuration representation. As indicated at 502, the target system may be configured according to the modified system configuration information. In one embodiment, the target system may have a different hardware configuration than the source system. As indicated at 504, files of the source system may be copied to the target system.

In one embodiment, a direct restore may be performed over a connection between the source and target systems, e.g. a network connection as illustrated in FIG. 6 or a direct connection. In one embodiment, a direct restore may be performed by backing up the source system to a storage medium (e.g. an external disk, tape, or removable medium) and then restoring from the storage medium to the target system.

Embodiments of a direct restore mechanism may be used, for example, to migrate one system (e.g. PC) to another system (e.g. PC) of a different manufacturer and with different hardware. In one embodiment, this may be performed using one or more CDs or other removable media and without any supporting backup applications, boot or file servers. For example, end users can migrate their applications (system and data) from an existing IBM Netfinity server to a Dell PowerEdge. The DELL does not need to be installed. With embodiments of a direct restore mechanism, this may be performed without existing backups. After the restore, the target system (e.g. the Dell) may "look" exactly like the target system (e.g. the IBM) or may be modified as desired or required. Modifications may include one or more of, but are not limited to, different network identity, different storage layouts (e.g. RAID5 from SIMPLE volumes), etc.

In one embodiment, direct restore mechanism software may be installed on the source system. In one embodiment, this software has a small footprint. The target system is booted with a direct restore mechanism boot medium (e.g. CD). The boot medium may be generated at the end user's site as it may include the operating system (e.g. the Windows 2000 operating system). The boot medium may also include software to perform the mapping from the source system's hardware to the target system's hardware.

In one embodiment, the boot medium may install a temporary operating system (e.g. the Windows 2000 operating system) on the target system and ask the source system for its hardware configuration. Software on the boot medium may then perform user-directed mappings of the source system's configuration or alternatively create an exact clone of the source system. Once completed, software on the boot medium may ask the source system for its, Registry, System files and all other files. Once completed, further mappings may be performed automatically, and the target system is ready for reboot. Once rebooted, the migration is complete.

FIG. 8 illustrates setup and restore using a direct restore mechanism according to one embodiment. In one embodiment, to set up and restore a source system 400A to a target system 400B, direct restore mechanism software may be installed on the source system 400A. A boot medium 416 (e.g. a boot floppy or CD) may then be created on the source system 400A. An operating system (e.g. Windows 2000) medium (e.g. CD) may then be inserted on the target system 400B. The MAC address of the target system may then be configured. The target system may then be booted from the boot medium 416. A repair environment may be created on the target system from the source system. The source system's files may then be copied to the target system. In one embodiment, the registry and boot.ini on the target system may then be modified as necessary or desired. One or more other restore tasks may then be performed, similar to the network restore mechanism as described above. The target system may then be rebooted. The target system reboots with the source system's files, operating system, hardware configuration and settings, etc.

As an example, an end user desires to migrate the application and OS configuration from a source system (e.g. IBM Netfinity) to a target system (e.g. Dell PowerEdge). The IBM Netfinity may run a Web application with an Oracle database on some 10 Mg IDE drives. Direct restore mechanism software may be installed on the target system (e.g. IBM). In one embodiment, direct restore mechanism software may include one daemon and two commands. In one embodiment, the daemon performs a backup. In one embodiment, this backup is performed using a subset of NetBackup client software. One command performs a "save configuration" to generate configuration representation 420. The other command allows the user to input basic configuration for the target system including, but not limited to, networking configuration.

A bootable direct restore mechanism CD (or other boot medium) may be inserted into the target system (e.g. Dell) and the target system may be booted from the CD. The direct restore mechanism CD (or other boot medium) inserted into the target system is a bootable CD that lays down a repair kernel used to stage the migration. The repair kernel is configured to use the proper network settings. The target system is booted into the repair kernel and runs a direct restore process. The direct restore process gets the source system (e.g. IBM Netfinity) configuration and compares it to the target system (e.g. Dell PowerEdge) configuration. In one embodiment, the direct restore process performs a best-fit mapping and then lets the user change these mappings or add new ones. For example, the database maybe using a raw partition on the IBM but the user wants to use RAID5 dynamic disk instead. Once the mapping is done, the disk layouts are created and the user may be asked to reboot the target system (e.g. Dell).

In one embodiment, when prompted, an operating system (e.g. Windows 2000) CD or other medium may be inserted into the Dell. In one embodiment, the end user supplies the operating system CD 414 (e.g. a Microsoft 2000 System CD).

When prompted, upgrades to the drive, network, or other hardware configuration may be optionally performed. The user may then be prompted for a final reboot (from the installed system drive, not one of the CDs). The IBM may be taken off the network, if desired. The target system (e.g. Dell) reboots and the migration is finished.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   a source device; and
   a target device having a different hardware configuration than the source device;
   a configuration transfer mechanism configured to:
      capture a configuration representation of the source device, wherein the configuration representation comprises system configuration information and file data of the source device;
      generate, remotely from the target device, a modified version of the captured configuration representation of the source device to account for differences in hardware configurations between the source device and the target device; and
      after generating the modified version of the configuration representation, configure the target device according to the modified version of the configuration representation.

2. The system as recited in claim 1, wherein the configuration transfer mechanism comprises:
   a restore server configured to:
      capture the system configuration information into the configuration representation;
      modify the configuration representation to generate the modified version of the configuration representation; and after generating the modified version of the configuration representation, configure the target device according to the modified version of the configuration representation; and a backup server configured to back up and store the file data of the source device.

3. The system as recited in claim 2, wherein the source device comprises an agent of the configuration transfer mechanism configured to provide the system configuration information to the restore server.

4. The system as recited in claim 1, wherein the target device is configured to couple to the source device, and wherein the configuration transfer mechanism comprises a first software component on the source device and a second software component on the target device.

5. The system as recited in claim 1, wherein the system configuration information comprises hardware and software configuration information.

6. The system as recited in claim 1, wherein, to configure the target device according to a modified version of the configuration representation, the configuration transfer mechanism is further configured to:

after generating the modified version of the configuration representation, configure the target device according to the system configuration information from the modified version of the configuration representation; and restore the file data of the source device to the target device.

7. A system for transferring a configuration from a source device to a target device, comprising:

means for capturing a configuration representation of the source device, wherein the configuration representation comprises system configuration information and file data of the source device;

means for generating, remotely from the target device, a modified version of the captured configuration representation of the source device to account for differences in hardware configurations between the source device and the target device; and means for configuring the target device according to the modified version of the configuration representation after generating the modified version of the configuration representation.

8. A method, comprising:

capturing a configuration representation of a source device, wherein the configuration representation comprises system configuration information and file data of the source device;

generating, remotely from a target device, a modified version of the captured configuration representation of the source device to account for differences in hardware configurations between the source device and the target device; and after generating the modified version of the configuration representation, configuring the target device according to the modified version of the configuration representation.

9. The method as recited in claim 8, wherein said capturing, said modifying, and said configuring are performed by one or more servers on a network.

10. The method as recited in claim 8, wherein said capturing and said modifying are performed by the source device.

11. The method as recited in claim 8, wherein the system configuration information comprises hardware and software configuration information.

12. The method as recited in claim 8, wherein, in said configuring a target device according to the modified version of the configuration representation, the method further comprises:

configuring the target device according to the system configuration information from the modified version of the configuration representation; and restoring the file data of the source device to the target device.

13. A computer-accessible storage medium, comprising program instructions, wherein the program instructions are configured to implement:

capturing a configuration representation of a source device, wherein the configuration representation comprises system configuration information and file data of the source device;

generating, remotely from a target device, a modified version of the captured configuration representation of the source device to account for differences in system configuration including differences in hardware configurations between the source device and the target device; and after generating the modified version of the configuration representation, configuring the target device according to the modified version of the configuration representation.

14. The computer-accessible storage medium as recited in claim 13, wherein said capturing, said modifying, and said configuring are performed by one or more servers on a network.

15. The computer-accessible storage medium as recited in claim 13, wherein said capturing and said modifying are performed by the source device.

16. The computer-accessible storage medium as recited in claim 13, wherein the system configuration information comprises hardware and software configuration information.

17. The computer-accessible storage medium as recited in claim 13, wherein, in said configuring a target device according to the modified version of the configuration representation, the program instructions are further configured to implement:

configuring the target device according to the system configuration information from the modified version of the configuration representation; and restoring the file data of the source device to the target device.

18. A system, comprising:

a source device; and a target device configured to couple to the source device, wherein the target device has a different hardware configuration than the source device;

a configuration transfer mechanism configured to:

generate, remotely from the target device, a modified version of captured system configuration information of the source device to account for differences in hardware configurations between the source device and the target device;

after generating the modified version of the configuration representation, configure the target device according to the modified system configuration information; and copy file data of the source device to the target device.

19. The system as recited in claim 18, wherein the configuration transfer mechanism comprises a first software component on the source device and a second software component on the target device.

20. The system as recited in claim 18, wherein the system configuration information comprises hardware and software configuration information.

21. The system as recited in claim 18, wherein the configuration transfer mechanism is further configured to:
   generate a configuration representation for the source device, wherein the configuration representation comprises the system configuration information and the file data; and
   to modify system configuration information of the source device, modify the system configuration information in the configuration representation.

22. A system for transferring a configuration from a source device to a target device, comprising:
   means for generating, remotely from the target device, a modified version of captured system configuration information of the source device to account for differences in hardware configurations between the source device and the target device; and
   means for configuring the target device according to the modified system configuration information after generating the modified system configuration information; and
   means for copying file data of the source device to the target device.

23. A method, comprising:
   generating, remotely from a target device, a modified version of captured system configuration information of a source device to account for differences in hardware configurations between the source device and the target device; and
   after generating the modified system configuration information, configuring the target device according to the modified system configuration information; and
   copying file data of the source device to the target device.

24. The method as recited in claim 23, wherein the source device is coupled to the second device, wherein said modifying is performed by a first software component on the source device, and wherein said configuring and said copying are performed by the first software component on the source device and a second software component on the target device.

25. The method as recited in claim 23, wherein the system configuration information comprises hardware and software configuration information.

26. The method as recited in claim 23, further comprising:
   generating a configuration representation for the source device, wherein the configuration representation comprises the system configuration information and the file data; and
   wherein said modifying system configuration information of a source device comprises modifying the system configuration information in the configuration representation.

27. A computer-accessible storage medium, comprising program instructions, wherein the program instructions are configured to implement:
   generating, remotely from a target device, a modified version of captured system configuration information of a source device to account for differences in hardware configurations between the source device and the target device;
   after generating the modified system configuration information, configuring the target device according to the modified system configuration information; and
   copying file data of the source device to the target device.

28. The computer-accessible storage medium as recited in claim 27, wherein the source device is coupled to the second device, wherein said modifying is performed by a first software component on the source device, and wherein said configuring and said copying are performed by the first software component on the source device and a second software component on the target device.

29. The computer-accessible storage medium as recited in claim 27, wherein the system configuration information comprises hardware and software configuration information.

30. The computer-accessible storage medium as recited in claim 27, further comprising:
   generating a configuration representation for the source device, wherein the configuration representation comprises the system configuration information and the file data; and
   wherein, in said modifying system configuration information of a source device, the program instructions are configured to implement modifying the system configuration information in the configuration representation.

* * * * *